United States Patent [19]

Inagami et al.

[11] 3,996,391
[45] Dec. 7, 1976

[54] METHOD FOR PRODUCTION OF SYRUP FOR SOFT DRINK

[75] Inventors: Kaoru Inagami, Tokyo; Mizuho Tanaka, Tachikawa, both of Japan

[73] Assignee: Calpis Shokuhin Kogyo Kabushiki Kaisha, Tokyo, Japan

[22] Filed: Dec. 17, 1974

[21] Appl. No.: 533,649

[52] U.S. Cl. .............................. 426/590; 426/580; 426/587; 426/588
[51] Int. Cl.² ..................... A23L 2/00; A23C 23/00
[58] Field of Search .......... 426/185, 190, 213, 599, 426/580, 590, 658

[56] References Cited
UNITED STATES PATENTS 3,800,052   3/1974   Inagami et al. .................... 426/185

Primary Examiner—A. Louis Monacell
Assistant Examiner—C. A. Fan
Attorney, Agent, or Firm—Stevens, Davis, Miller & Mosher

[57] ABSTRACT

A method for producing a syrup from which a soft drink containing cow's milk and having stable white turbidity resembling that of cow's milk is produced is disclosed, wherein the syrup is produced by mixing as basal ingredients cow's milk, sugar and an edible acid under a specific condition without use of any stabilizer for the suspension of milk protein.

5 Claims, No Drawings

METHOD FOR PRODUCTION OF SYRUP FOR SOFT DRINK

BACKGROUND OF THE IVENTION

This invention relates to a method for the production of a syrup from which is prepared a soft drink containing cow's milk and having stable white turbidity resembling that of cow's milk.

Filling techniques popularly employed in the production of a soft drink fall under two large kinds of processes of a post-mix process and a pre-mix process. In the post-mix process, a measured volume of prepared syrup is poured into a container as the container passes under the syrup filler. Then the container is conveyed to the second filler, at which diluting water or carbonated water delivered from a carbonator is added in a fixed volume to the container. After that, the container is capped In contrast in the pre-mix process, required amounts of prepared syrup and water are automatically and continuously measured out. The measured liquids are mixed, cooled and, when it is necessary, carbonated prior to conveyance to the filler. The mixed liquid thus obtained is immediately forwarded to the filler, at which it is placed in each container and sealed with a cap. The prepared syrup to be used in the production of a soft drink is generally diluted with water or carbonated water to a volume three to four times the original volume to become the final product. Generally in the production of a carbonated beverage, the raw materials other than carbonic acid gas and diluting water are invariably supplied in the form of a mixed prepared syrup. Only in this way, commercialization of the production can be accomplished.

It is desirable from the nutritional point of view that a soft drink contains cow's milk. The state in which a protein contained in a drink exists, has a profound effect upon the flavor of that drink. In the case of a carbonated drink, when the protein exists in a suspended state, namely, when it is uniformly dispersed in the form of fine particles to give the drink the appearance of white uniform turbidity, it serves to mitigate the stimulus of carbon dioxide, renders the taste of the drink mild and gives forth refreshing sensation. If the protein remains in a soluble state, the drink tastes stale so that the refreshing sensation is degraded and the palatability is spoiled. In an acidic solution containing cow's milk, milk protein tends to coagulate and undergo precipitation in the absence of a stabilizer, rendering the stable retention of white turbidity difficult to achieve.

SUMMARY OF THE INVENTION

An object of the present invention is to provide a method for producing a syrup, by preparing at first an aqueous mixture by use of as basal ingredients cow's milk and sugar (which is the sum of sugar of the cow's milk and a supplementarily added sugar), and thereafter by mixing an edible acid and the aforementioned aqueous mixture. In order to prepare an aforementioned aqueous mixture, adding water is necessary as occasion demands, for instance in case of using powdery skim milk as cow's milk. The syrup is diluted with water or carbonated water to a volume from 3 to 4 times the original volume to give a soft drink having stable white turbidity, and to provide the syrup produced by the method described. When it is desired, the syrup can include a sweetener besides sugar, a flavoring, etc. as needed. To obtain the syrup of this invention, the basal specified ingredients are required to be mixed under limited conditions.

DETAILED DESCRIPTION OF THE INVENTION

The syrup according to the present invention contains cow's milk, sugar and an edible acid as its basal ingredients and, when it is necessary, contains a sweetner, a flavoring, etc. additionally. By diluting this syrup with water or carbonated water to a volume from 3 to 4 times the original volume, there can be produced a soft drink having stable white turbidity resembling that of cow's milk. In this respect, the present invention is characterized by obviating the necessity of a stabilizer useful for the dispersion of milk portion.

"Cow's milk" as used throughout the present specification and also claims is, for example, a member selected from the group consisting of whole milk, skim milk, sweetened whole milk, sweetened skim milk, condensed whole milk, condensed skim milk, sweetened condensed whole milk, sweetened condensed skim milk, powdery whole milk, powdery skim milk, sweetened powdery whole milk, sweetened powdery skim milk, reconstituted whole milk, reconstituted skim milk, sweetened reconstituted whole milk, sweetened reconstituted skim milk, mixtures of suitably selected members thereof, a solution of powdery skim milk dissolved in a certain amount of water and so on. The aforementioned "sweetened" means "sugar-added". Cow's milk is used in an amount such as to give a milk-solids-not-fat content of 3.0 to 5.0% by weight based on the entire weight of the syrup. Any amount of cow's milk which falls short of the lower limit of 3.0 w/w% of milk-solids-not-fat content does not satisfy the objects of this invention, because the white turbidity produced when the syrup is diluted with a specified volume of water or carbonated water is insufficient and the effect in terms of flavor is degraded. Any amount of milk exceeding the upper limit of 5.0 w/w% of milk-solids-not-fat content is undesirable because the stable suspention of milk protein is impaired.

For the purpose of the present invention, any of the sugar such as cane sugar, beet sugar, maple sugar, sucrose, glucose, fructose, maltose, lactose invert sugar and honey sugar can be used either independently or in any convenient combination without any specific restriction. As a sweetner, therefore, there may be used sugar alcohol, saccharine, dipeptide, etc., to say nothing of the sugar enumerated above. Such non-sugar sweetner is required to be used in conjunction with some of the aforementioned sugar. At times it proves desirable to use such sugar in the form of liquid sugar.

The term "edible acid" used throughout the specification and also claims refers to an edible organic acid, an edible inorganic acid and a mixture thereof. The edible acid in the syrup functions to suspend cow's milk in white trubidity and, in the case of a carbonated drink, gasify carbonic acid ion. The edible acid is required to be incorporated in an amount such that the pH value of the syrup falls in the range of from 3.0 to 3.4. If the pH value of the syrup is less than the lower limit of 3.0, then the milk protein assumes a soluble state when the syrup is diluted with a stated volume of water or carbonated water. If the syrup has a pH value exceeding 3.4, the white turbidity of the produced drink is impaired. Thus, the edible acid fails to fulfil its purpose in this invention when the pH value falls outside the specified range.

This invention requires the aforementioned basal ingredients, i.e., cow's milk, sugar and an edible acid, to be mixed under specific conditions. At the first step of the present invention, the aqueous mixture should be prepared by use of as basal ingradients cow's milk (containing water or not containing water) and sugar (which is the sum of the sugar of cow's milk and a supplementarily added sugar). The sugar is used in an amount of not less than 3 times the weight of the specified milk-solids-not-fat content derived from cow's milk in the syrup. The specified amount of sugar is used before adding an edible acid. In case that cow's milk contains enough amount of sugar like high sweetened condensed skim milk, the amount of the aforementioned supplementarily added sugar will be able to be zero. To be concrete, in order to prepare the aforementioned aqueous mixture, adding water is necessary as occasion demands, for instance in case of using as cow's milk powdery skim milk or high condensed whole milk and the like. It is easily understood that fresh whole milk has enough water to prepare the aforementioned aqueous mixture of cow's milk and sugar. At the second step of the present invention, the aqueous mixture of cow's milk and sugar is mixed with an edible acid under the specified temperature condition. For the purpose of this acidification, the edible acid is desired to be used in the form of an aqueous solution having a concentration of about 50 w/w%. If the sugar is used in an amount of less than 3 times the weight of the specified milk-solids-not-fat content, the acidification causes the possibility that the resultant syrup, when diluted with a stated volume of water or carbonated water, will induce precipitation of milk protein. The upper bound of the sugar amount inevitably depends upon the desired sweetness of the produced soft drink.

Besides satisfying the aforementioned composition of basal ingredients and the sequence of the combination of these ingredients, the present invention requires the mixture containing cow's milk, sugar and an edible acid as basal ingredients to be maintained in a specific range of temperatures during and after the stage of preparation of the syrup. The temperature of the aqueous mixture containing cow's milk and sugar is only required to ensure thorough solution of the added sugar or for example powdery milk, and therefore, need not be specified in particular. The mixture (syrup) containing cow's milk, sugar and an edible acid as basal ingredients is required to be maintained in a temperature range of from −3° C to 40° C, preferably from 0° C to 35° C. If the temperature of the mixture (syrup) falls outside the range of from −3° C to 40° C, the produced syrup, when diluted with a specified volume of water or carbonated water to produce a drink, fails to keep milk protein in stable suspension. For the purpose of preservation, the produced syrup is desired to be kept in a temperature range of from −3° C to 30° C.

The present invention will be described more specifically with reference to preferred embodiments, which are illustrative of and not limited in any way of the present invention.

EXAMPLE 1

Whole milk 1050 kg in weight was heated up to 60° C and 819 kg of cane sugar was added to and dissolved in the warmed whole milk. The mixed liquid was sent through a heat exchanger to be cooled down to 30° C. The cooled mixture was mixed under agitation with 50 w/w% citric acid aqueous solution of 38.2 kg, with the result that the resultant mixture assumed a pH value of 3.25. This acidic mixed liquid (30° C in temperature) was further admixed with 16 kg of a lemon-lime flavoring to produce 1923.2 kg of syrup. The syrup was preserved at 20° C.

EXAMPLE 2

Powdery skim milk 232.4 kg was dissolved in 1016.8 kg of water at 40° C and the resultant solution was mixed with 3432.8 kg of aqueous invert sugar solution having a concentration of 67%. This mixed liquid was cooled down to 5° C, thereafter at 5° C adjusted to pH 3.3 with added phosphoric acid and then further mixed with 43 kg of an orange-lemon flavoring to produce 4750 kg of syrup.

EXAMPLE 3

One hundred (100) kg of sweetened condensed whole milk containing 28 w/w% of total-milk-solids content and 43 w/w% of sucrose was mixed under agitation with 227 kg of water at 40° C and then 85 kg of glucose was added to and mixed with the mixed liquid. The resultant mixture was cooled down to 10° C, and was combined with 50 w/w% citric acid aqueous solution of 12.2 kg, 284 g of saccharine and 5 kg of an orange-lime flavoring (with the temperature of the mixed liquid at 15° C) to produce 429.5 kg of syrup with 15° C.

What is claimed is:

1. A syrup comprising, as its basal ingredients,
   a. cow's milk in an amount to give a milk-solids-not-fat content of from 3.0 to 5.0 w/w% in the syrup,
   b. sugar (the sum of sugar of the cow's milk and a supplementarily added sugar) in an amount to give a sugar content of at least 3 times the weight of said milk-solids-not-fat content in the syrup, and
   c. an edible acid to give the syrup a pH value of from 3.0 to 3.4.

2. The syrup of claim 1 wherein the cow's milk in the step (a) is at least one member selected from the group consisting of whole milk, skim milk, sweetened whole milk, sweetened skim milk, reconstituted whole milk, reconstituted skim milk, sweetened reconstituted whole milk, sweetened reconstituted skim milk, sweetened condensed whole milk, sweetened condensed skim milk, powdery whole milk, powdery skim milk, sweetened powdery whole milk and sweetened powdery skim milk.

3. A method for the production of a syrup which will produce a soft drink having stable white turbidity when diluted with water or carbonated water to a volume of from 3 to 4 times its original volume, consisting essentially of
   a. preparing an aqueous mixture containing as basal ingredients, cow's milk and sugar in amounts such that the cow's milk give a milk-solids-not-fat content of from 3.0 to 5.0 w/w% in the syrup and the sugar gives a sugar content of at least 3 times the weight of said milk-solids-not-fat content, and
   b. mixing an edible acid and the aqueous mixture prepared in (a) at a ratio to give the resulting syrup a pH value of from 3.0 to 3.4, wherein the preparing and mixing are carried out at temperatures in the range of −3° C to 40° C.

4. The method of claim 3, wherein the cow's milk involved in the step (a) is at least one member selected from the group consisting of whole milk, skim milk, sweetened whole milk, sweetened skim milk, reconstituted whole milk, reconstituted skim milk, sweetened reconstituted whole milk, sweetened reconstituted skim milk, condensed whole milk, condensed skim milk, sweetened condensed whole milk, sweetened condensed skim milk, powdery whole milk, powdery skim milk, sweetened powdery whole milk and sweetened powdery skim milk.

5. The method of claim 3, wherein the temperatures in the step (b) are in the range of from 0° C to 35° C.

* * * * *